June 1, 1937. T. THOMPSON 2,082,366
CLAMP
Filed Aug. 8, 1934
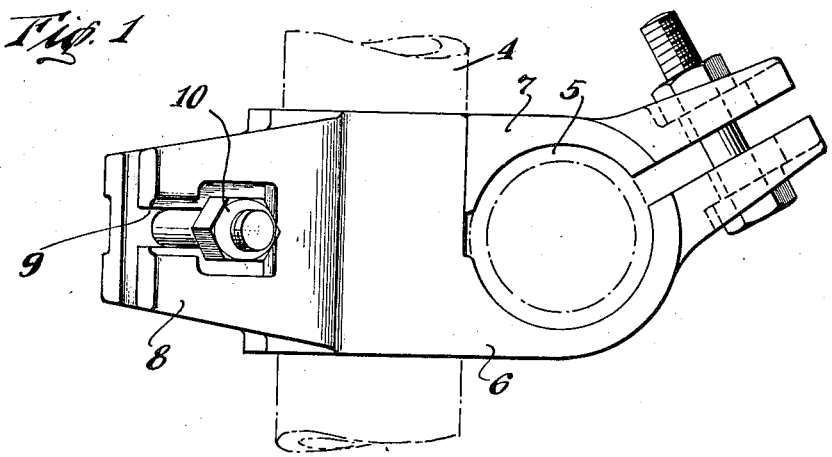
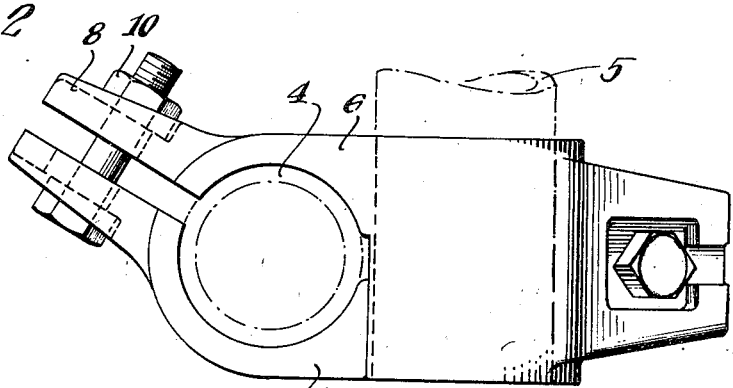
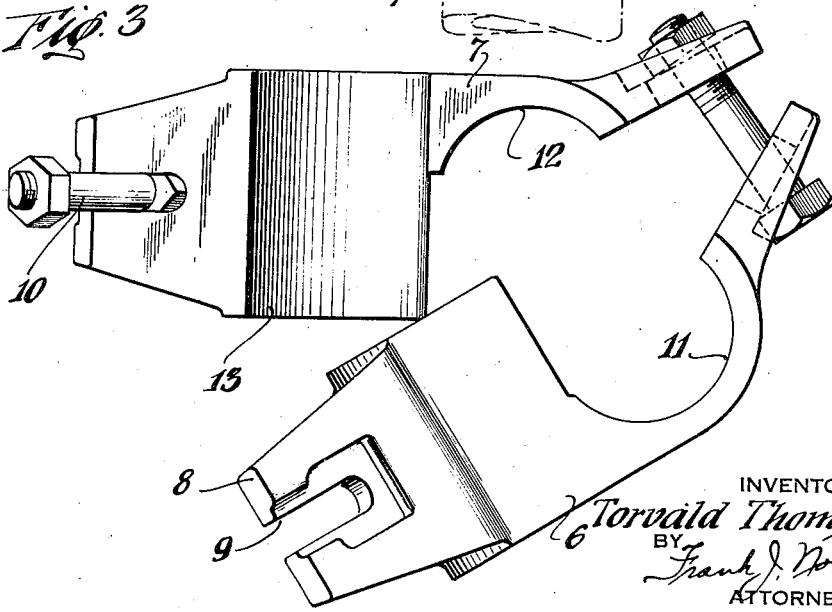
INVENTOR
Torvald Thompson
BY
Frank J. Novotny,
ATTORNEY

UNITED STATES PATENT OFFICE 2,082,366

CLAMP

Torvald Thompson, New York, N. Y.

Application August 8, 1934, Serial No. 738,940

1 Claim. (Cl. 189—36)

This invention relates to couplings, or clamps or fastening devices, designed for securing two parts in angular relationship one to the other, for example for securing one pipe to another pipe. The invention is especially adapted for use with scaffolds and similar supporting structures of a framework type.

A coupling or clamp according to this invention comprises two parts each embodying one relatively rigid element joined to each other by means of bolts, the two parts serving to clamp the pole or other body to another pole or fixed member.

According to one form of the invention, the device comprises a body in the form of semi-circular gripping plates having a curved inner surface preferably provided with projections upon each side thereof and adapted to partially surround the body to which it is applied. Bolted at one end to one of the body portions is a capping member having a curved inner surface, said capped portions being adapted to cooperate with the curved surface upon the body of the device to be fastened, and having at its outer or free end suitably placed or spaced lugs or ears between which passes an eye-bolt secured to one of the lugs upon the body of one of the clamping portions.

An object of this invention is to provide a coupling device that is simple, and has its principal members permanently but movably united and which has no loose, or separate parts.

Another object of this invention is to provide a coupling device which can be quickly attached and secured firmly in the position necessary to hold the connecting elements rigidly together.

This invention comprises two clamps for engagement with the elements to be coupled, said clamps having adjacent connected sections to be located between said elements, and also having securing means for the two clamps, so as to tighten the same upon said elements whereby the device is held fast.

Further advantages and features of the improved coupling device, and the form, construction and relative arrangement of its several parts will be hereinafter more fully set forth, illustrated in the following and accompanying drawing and subsequently incorporated in the included claim.

The drawing shows several views and embodiments of the invention, and the same reference characters designate the same parts throughout the several views,—

Figure 1 is a view, partly in perspective, showing one form of the improved coupling device as actually applied to two perpendicularly disposed pipes, also showing a side or front view.

Figure 2 is a bottom view of the same clamp shown in Fig. 1.

Figure 3 is a view of the apparatus disclosed in Fig. 1, but, however, showing the sections of the clamp in opened relationship, and ready to be put in position around the pipes that are to be connected.

Referring, now, to the drawing with more particularity, 4 and 5 are the pipes which are sought to be rigidly fastened together.

Clamp sections 6 and 7 are practically duplicates of one another and may be cast from the same molds, except that, after casting, section 6 has one lug portion, namely 8 slotted or bifurcated as at 9. This enables one to open the clamped sections without entirely dismantling the bolt 10.

The pipes 5 and 6 are shown to fit snugly within the semi-circular grooves as shown at 11, 12, and 13 respectively of sections 6 and 7.

It will be apparent that a coupling device of the above description may be readily and easily applied and adjusted so as to rigidly connect two pipes such as 6 and 7 and securely and positively hold them against sliding movement. Thus, after bolt 10 is loosened, section 6 may be slid apart from its closely fitting conformity with section 7 and then portions 12 and 13 of section 7 may be fitted around a part of each of the pipes 5 and 4 respectively. Then section 6 may be pressed over the pipes in a manner well understood to those versed in the related arts, namely portion 11 thereof will be forced against the remaining uncovered half of pipe 5, etc., etc. Then bolt member 10 is inserted in the slot 9 and the whole is fastened by tightening both of the bolts shown in the drawing.

This arrangement of the respective sections renders a very strong and secure joint. No further adjustments and turning of parts is necessary. This device may furthermore be made for connecting variously associated pipes such as pipes making an angle of 30°, 45°, 60°, or 90° with each other. It is also clear that it is positively impossible to have any turning movement of the two parts of the coupling or of the two pipes that are coupled by this improved coupling means or clamping means. Furthermore, by reason of the interlocking relationship of the two parts or sections 6 and 7 it is apparent that the bolts, such as 10, are relieved of any and all strains which might occur from any tendency on the part of the pipes 4 and 5 to rotate in any possible direction.

From the foregoing description taken in connection with the accompanying drawing, it is believed that the form, construction and several advantages of the device will be clear. In each case, it will be appreciated that the device will have maximum strength and durability while at the same time, it is of comparatively light weight and can be easily handled and quickly applied to securely couple the two elements together. Certain constructions have been referred to, which are believed to be thoroughly practical, but it is nevertheless to be understood that the device may be susceptible to embodiment in various other alternative structures and accordingly, the privilege is reserved of resorting to all such legitimate changes in the form, construction, and relative arrangement of the various elements as may be fairly incorporated within the spirit and scope of the invention as claimed.

What is claimed is:

A connecter for angularly related crossing members, comprising a pair of counterpart members, each of said members consisting of two cross-sectionally semi-circular integral portions arranged with their axes in angularly related and relatively spaced positions, each of said counterpart members terminating in a flange, the flanges at one end of each of said opposing counterpart members being normally inseparably and pivotally connected, one of the flanges at the opposite end having a bolt normally inseparably associated therewith and the opposite flange having a slot for receiving said bolt, whereby one of said counterparts may be easily swung free from the other and the connecter easily readjusted.

TORVALD THOMPSON.